United States Patent Office 3,557,289
Patented Jan. 19, 1971

3,557,289
CONTROL OF TERRESTRIAL MOLLUSKS
Obren Keckemet, Tacoma, Wash., assignor to Pennwalt Corporation, Philadelphia, Pa., a corporation of Pennsylvania
No Drawing. Filed Mar. 7, 1969, Ser. No. 805,377
Int. Cl. A01n 9/00
U.S. Cl. 424—288                                                 5 Claims

ABSTRACT OF THE DISCLOSURE

Method of controlling terrestrial mollusks using hexamethylditin as active agent.

---

Terrestrial mollusks such as slugs, snails, and the like are well known enemies of plant cultivation. Mollusks destroy practically all substances of vegetable origin and are both a nuisance and economic hazard to growers of various products, including field crops, citrus fruit growers and particularly, vegetable growers, nurseries and home gardeners. Because mollusks multiply so rapidly they can quickly destroy all the seedlings or devour all the harvest in a cultivated area. It is a known fact that a mollusk can eat its own weight in two days.

In accordance with this invention, there is provided a method for controlling terrestrial mollusks comprising the application to an area to be controlled, a molluskicidal amount of hexamethylditin.

The active agent used in the invention, hexamethylditin, is a known compound and may be prepared in accordance with the procedures set forth by G. Gruttner, Chem. Ber. 50, 1808 (1917), or by other known methods. In preparing the composition of the invention for combating mollusks, a carrier will be mixed with molluskicidal amount of hexamethylditin, which amount for spot treatments will be preferably in the range of about from 0.01% to about 10% by weight of the total composition. On a pound per acre basis, from about 0.1 to about 10 pounds per acre of active ingredient will be used. It will be understood that the carrier plus active agent may also embody other materials such as baits for attracting mollusks and other agents may be present such as those which help in the application or distribution of the agent. The carrier may, of course, be a liquid or solid carrier and the compositions may be made in the form of a paste which may be spread on the soil whereby the mollusks come in contact with the composition. In liquid formulations the hexamethylditin will preferably be dispersed with or without suspending agents in liquid solvents. Where a solid carrier is used, a carrier may be any one of the well known readily available finely divided solids such as vermiculites, cellulosic materials, sand, silicates, and the like.

As indicated, the invention is applicable to the control of terrestrial mollusks and it is surprising that hexamethylditin is specific to this type of organism. Particular mollusks which have been tested and which are responsive to the hexamethylditin include, but are not limited to, Arion ater (European black slug), Helix aspersa (brown garden snail.) Limax maximus (spotted garden slug), and Deroceras reticulatum (grey garden slug). In order to further illustrate the invention the following examples are given.

EXAMPLE 1

Formulations (A) Typical bait formulation:                      Percent
    Hexamethylditin [1] _____ 0.25
    Bait-carrier [2] _____ 98.75
    Sticker [3] _____ 1.00
                                                   _____
                                                   100.00

[1] Dissolved in acetone to facilitate incorporation.
[2] Alfalfa flour, mill run wheat bran, yeast or ground apple pumice.
[3] Polyvinyl alcohol.

(B) Typical solvent formulation:
    Hexamethylditin _____ 20
    Xylene _____ 79
    Triton X–161 (surfactant) _____ 1
                                                   _____
                                                   100

(C) Typical wettable powder formulation:
    Texamethylditin _____ 25
    Fullers earth _____ 59
    Petro WPX (anticaking agent) _____ 3
    Marasperse N (surfactant) _____ 3
    Ascorbic acid _____ 10
                                                   _____
                                                   100

(D) Typical granular formulation:
    Texamethylditin _____ 10
    Ground corn cob _____ 87
    Xylene _____ 3
                                                   _____
                                                   100

These formulations can be sprayed, dusted or otherwise applied or can be made into a paste or any other suitable form.

EXAMPLE 2

Evaluations were made at approximately 62° F. Each of three replications consisted of five animals in a testing box constructed with an open arena of moist soil and covered refuge containing wet peat moss. The test baits were formulated on mill-run wheat bran with acetone added to dissolve and incorporate the chemicals. A small pile of bait in the center of the arena was the only source of food for the animals in each test box. Observations were made at regular intervals of numbers of animals lying (usually affected by the chamicals) in the arenas, or dead. Death was determined by tapping immobile animals with a pencil, animals being recorded as dead if no sign of contraction was seen.

The following Table 1 indicates the data obtained.

TABLE I.—EFFECT OF HEXAMETHYLDITIN FOR CONTROL OF MOLLUSKS

| Mollusk | Concentration of agents, percent | Number of slugs after— | | | | | | Percent after 14 days, dead |
|---|---|---|---|---|---|---|---|---|
| | | 48 hours | | 4 days, dead | 7 days | | 14 days, dead | |
| | | Affected | Dead | | Affected | Dead | | |
| Arion ater | 1.0 | 3 | 0 | 5 | 0 | 12 | 12 | 80.0 |
| | 0.5 | 3 | 0 | 3 | 0 | 13 | 15 | 100.0 |
| | 0.25 | 2 | 0 | 1 | 2 | 11 | 13 | 86.7 |
| Helix aspersa | 1.0 | 8 | 1 | 3 | 2 | 9 | 15 | 100.0 |
| | 0.5 | 11 | 0 | 6 | 0 | 12 | 15 | 100.0 |
| | 0.25 | 7 | 0 | 3 | 1 | 10 | 15 | 100.0 |
| | 1.0 | 11 | 0 | 7 | 1 | 12 | 15 | 100.0 |
| | 0.5 | 8 | 0 | 5 | 0 | 11 | 15 | 100.0 |
| | 0.25 | 5 | 1 | 4 | 1 | 8 | 13 | 83.3 |
| Limax maximus | 0.25 | 3 | 1 | 5 | _____ | 5 | 5 | 100.0 |

EXAMPLE 3

Following the test procedure of Example 2, numerous homologues of hexamethylditin were evaluated and found to be relatively ineffective. The data follows in Tables II and III.

It is obvious from the above table that only hexamethylditin and hexapropylditin have no effect on aquatic slugs, but as can be seen from Tables II and III, hexapropylditin is without significant effect against terrestrial slugs. Thus, the tables of data clearly illustrate the unexpected specific effect of hexamethylditin as a terrestrial molluskicide.

TABLE II

[Effect of various agents on *Helix aspersa* (brown garden snail)]

| Agent tested | Concentration of agent, percent | 48 Hours | | 4 days, Dead | 7 Days | | Percent dead after 14 days |
|---|---|---|---|---|---|---|---|
| | | Affected | Dead | | Affected | Dead | |
| Hexamethylditin | 1 | 7 | 1 | 5 | | 15 | 100.0 |
| Hexaethylditin | 1 | 3 | 0 | 2 | 1 | 2 | 33.3 |
| Hexapropylditin | 1 | 4 | 0 | 0 | 1 | 0 | 0.0 |
| Hexaisobutylditin | 1 | 7 | 0 | 1 | 3 | 2 | 26.7 |
| Hexabutylditin | 1 | 5 | 0 | 0 | 2 | 0 | 0.0 |
| Hexaamylditin | 1 | 10 | 1 | 1 | 2 | 3 | 33.3 |
| Untreated Check | | 2 | 0 | 0 | 4 | 0 | 13.3 |

TABLE III

[Effect of various agents on *Deroceras reticulatum* (grey garden slug)]

| Agent tested | Concentration of agent, percent | 48 hours | | 7 days | | Percent dead after 7 days |
|---|---|---|---|---|---|---|
| | | Affected | Dead | Affected | Dead | |
| Hexamethylditin | 1 | 8 | 4 | 1 | 14 | 93.3 |
| Hexaethylditin | 1 | 5 | 0 | 3 | 4 | 26.7 |
| Hexapropylditin | 1 | 3 | 0 | 5 | 8 | 53.3 |
| Hexaisobutylditin | 1 | 3 | 0 | 10 | 1 | 6.7 |
| Hexabutylditin | 1 | 3 | 0 | 5 | 5 | 33.3 |
| Hexaamylditin | 1 | 3 | 0 | 7 | 3 | 20.0 |
| Untreated check | | 1 | 0 | 2 | 0 | 0.0 |

EXAMPLE 4

Aquatic snails (*Planorbis corneus*) were exposed to various hexaalkylditin by adding the formulated agent to water containing the organisms. The following Table IV indicates the results obtained:

I claim:

1. A method for controlling terrestrial mollusks which

TABLE IV

| Agent tested | Formulation and concentration, p.p.m. | Effects after— | | |
|---|---|---|---|---|
| | | 6 hours | 24 hours | 48 hours |
| Hexamethylditin | 10% in cellosolve tested at— | | | |
| | 1 | None | None | None. |
| | 2.5 | do | do | Do. |
| | 5.0 | do | do | Do. |
| Hexabutylditin | 5% in isopropanol tested at— | | | |
| | 1 | do | do | Do. |
| | 2.5 | do | Bleeding | Dead. |
| | 5.0 | do | do | Do. |
| Hexaisobutylditin | 10% in diacetone alcohol tested at— | | | |
| | 1 | do | None | None. |
| | 2.5 | do | Bleeding | Dead. |
| | 5.0 | Bleeding | do | Do. |
| Hexapropylditin | 10% in isopropanol tested at— | | | |
| | 1 | None | None | None. |
| | 2.5 | do | do | Do. |
| | 5.0 | do | do | Do. |
| Hexaamylditin | 5% in isopropanol tested at— | | | |
| | 1 | do | Bleeding | 2 dead. |
| | 2.5 | do | do | Dead. |
| | 5.0 | do | do | Do. |
| Control | | do | None | None. | comprises contacting said mollusks with a molluskicidal amount of hexamethylditin.

2. The method of claim 1 where the mollusk is *Arion ater*.

3. The method of claim 1 where the mollusk is *Helix aspersa*.

4. The method of claim 1 where the mollusk is *Limax maximus*.

5. The method of claim 1 where the mollusk is *Deroceras reticulatum*.

References Cited

UNITED STATES PATENTS

| 3,284,296 | 11/1966 | Freiberg | 424—288 |
| 3,417,181 | 12/1968 | Cardarelli | 424—288 |
| 3,439,098 | 4/1969 | Freiberg | 424—288 |

OTHER REFERENCES

Chemical Abstracts 67: 107638z (1967).

JEROME D. GOLDBERG, Primary Examiner

PO-1050
(5/69)

UNITED STATES PATENT OFFICE
CERTIFICATE OF CORRECTION

Patent No. 3,557,289          Dated  1/19/71

Inventor(s)   Obren Keckemet, Tacoma, Washington.

It is certified that error appears in the above-identified patent and that said Letters Patent are hereby corrected as shown below:

In Column 2, line 26 "Texamethylditin" should read -- Hexamethyl

In Column 2, line 34 "Texamethylditin" should read -- Hexamethyl

Signed and sealed this 11th day of May 1971.

(SEAL)
Attest:

EDWARD M. FLETCHER, JR.
Attesting Officer

WILLIAM E. SCHUYLER, JR.
Commissioner of Patents